(12) United States Patent
Dahlheimer

(10) Patent No.: US 8,424,219 B2
(45) Date of Patent: Apr. 23, 2013

(54) DRYING APPARATUS FOR DRYING PELLETS

(75) Inventor: Stefan Dahlheimer, Kleinostheim (DE)

(73) Assignee: Automatik Plastics Michinery GmbH, Grossostheim (DE)

( * ) Notice: Subject to any disclaimer, the term of this patent is extended or adjusted under 35 U.S.C. 154(b) by 373 days.

(21) Appl. No.: 12/952,136

(22) Filed: Nov. 22, 2010

(65) Prior Publication Data

US 2011/0061261 A1 Mar. 17, 2011

(51) Int. Cl.
*F26B 25/00* (2006.01)

(52) U.S. Cl.
USPC .............. 34/236; 34/217; 34/219; 210/780; 210/785; 209/312; 209/321; 119/171

(58) Field of Classification Search .............. 34/102, 34/104, 85, 92, 217, 219, 236, 164; 210/767, 210/180, 785; 209/238, 312, 321; 119/171
See application file for complete search history.

(56) References Cited

U.S. PATENT DOCUMENTS

| | | | | |
|---|---|---|---|---|
| 3,287,408 A | * | 11/1966 | Veltman | 34/395 |
| 3,396,477 A | * | 8/1968 | Nora | 34/85 |
| 3,469,323 A | | 9/1969 | Jongbloed et al. | |
| 3,648,382 A | * | 3/1972 | Oldenkamp et al. | 34/92 |
| 3,900,958 A | | 8/1975 | Bongert et al. | |
| 4,193,206 A | * | 3/1980 | Maffet | 34/385 |
| 4,245,396 A | * | 1/1981 | Maffet | 34/386 |
| 4,785,551 A | * | 11/1988 | Meyer | 34/368 |
| 5,024,005 A | | 6/1991 | Stewart | |
| 5,098,586 A | | 3/1992 | Rudolph | |
| 6,125,549 A | * | 10/2000 | Pikus | 34/267 |
| 6,573,314 B1 | | 6/2003 | Knudsen et al. | |
| 7,412,782 B2 | * | 8/2008 | Dahlheimer | 34/491 |
| 7,574,816 B2 | * | 8/2009 | Shivvers | 34/333 |
| 2006/0075655 A1 | * | 4/2006 | Dahlheimer | 34/216 |
| 2008/0022547 A1 | * | 1/2008 | Shivvers | 34/333 |
| 2010/0107439 A1 | * | 5/2010 | Shivvers et al. | 34/477 |
| 2010/0154247 A1 | * | 6/2010 | Shivvers | 34/487 |
| 2011/0061261 A1 | * | 3/2011 | Dahlheimer | 34/236 |
| 2011/0232124 A1 | * | 9/2011 | Shivvers | 34/428 |

FOREIGN PATENT DOCUMENTS

| | | |
|---|---|---|
| DE | 1729451 A1 | 6/1971 |
| DE | 2054629 A1 | 5/1972 |
| DE | 3941392 C1 | 6/1991 |
| DE | 69910612 T2 | 3/2004 |
| DE | 102008025240 * | 12/2009 |
| EP | 0518016 A1 | 12/1992 |
| EP | 0938922 A2 | 9/1999 |
| JP | 63168314 A | 12/1988 |
| JP | 2006112774 A * | 4/2006 |
| WO | 9734679 A1 | 9/1997 |

* cited by examiner

*Primary Examiner* — Stephen M. Gravini
(74) *Attorney, Agent, or Firm* — Buskop Law Group, PC; Wendy Buskop

(57) ABSTRACT

One or more embodiments of a drying apparatus for drying pellets from a process fluid are provided. The drying apparatus can include at least one screen device. The at least one screen device can have a screen area with screen openings. The drying apparatus can also have an oscillating device that sets at least the screen area of the screen device into oscillation. The oscillations can move the pellets relative to the screen openings, and the process fluid can drain off through the screen openings.

19 Claims, 2 Drawing Sheets

DRYING APPARATUS FOR DRYING PELLETS

CROSS REFERENCE TO RELATED APPLICATIONS

The present patent application claims priority to and the benefit of co-pending International Patent Application No. PCT/EP2009/003689 filed May 25, 2009, entitled "APPARATUS FOR DRYING GRANULES," which claims priority to DE Application No. 102008025240.9, which was filed May 27, 2008. These references are incorporated in their entirety herein.

FIELD

The present embodiments generally relate to an apparatus for drying pellets.

BACKGROUND

A need exists for a apparatus that can easily and efficiently dry pellets, such as micropellets with a diameter less than 0.8 mm.

A further need exists for an apparatus for that can dry and cool pellets in a concurrent manner.

The present embodiments meet these needs.

BRIEF DESCRIPTION OF THE DRAWINGS

The detailed description will be better understood in conjunction with the accompanying drawings as follows.

Figure 1:
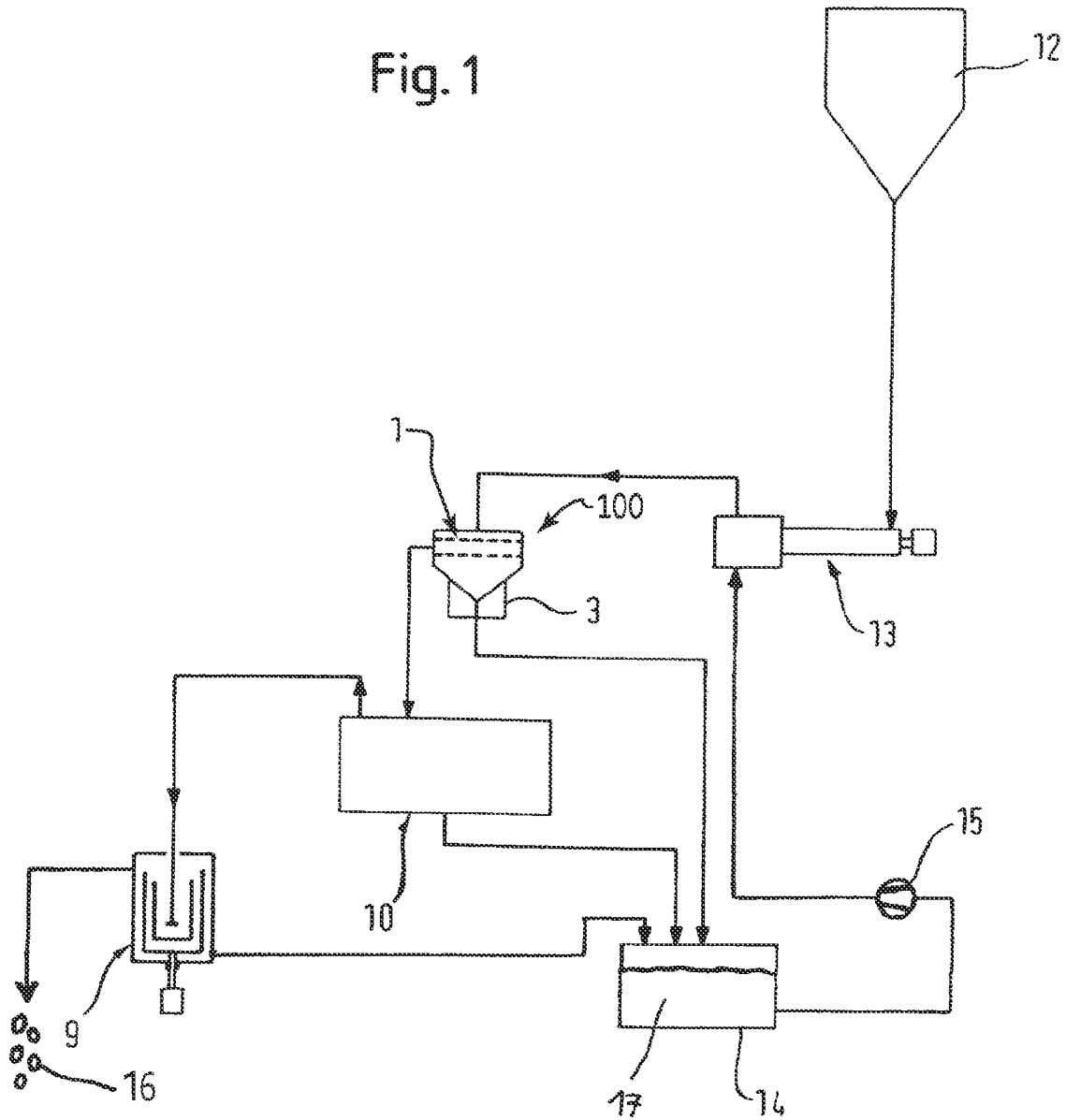
FIG. 1 depicts a schematic of a pelletizing unit with a drying apparatus according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a drying apparatus for drying pellets.

The drying apparatus for drying pellets can dry pellets that are suspend in a process fluid. The drying apparatus can have one or more screen devices. The screen device can have a screen area with screen openings and an oscillating device that sets at least the screen area of the screen device into oscillation. The oscillation can move the pellets relative to the screen openings. The process fluid can drain off through the screen openings.

The screen area of the screen device has screen openings. The cross-sectional areas of the screen opening can be smaller than the cross-sectional areas of the smallest pellets. In addition, the screen area of the screen device has a first drying zone. The pellets in the process fluid can be delivered to the first drying zone, and the process fluid can be drained off through the screen openings. The screen area can also have a second drying zone. Damp pellets can be subjected to stream of a drying fluid in the second drying zone.

The oscillating device can be configured to move the pellets from the first drying zone to the second drying zone under the influence of the oscillations.

The openings of the screen and the oscillating device can be configured to As a result of provide a uniform processing of pellets of any size. The degree of water separation and the dwell time of the pellets on the screen area, in the first drying zone. in the second drying zone, or combinations thereof can be set by adjusting the oscillation of the device.

The oscillating device can be arranged and operated such that the pellets move from the first drying zone to the second drying zone along spiral paths under the influence of the oscillations. The spiral paths can be configured to cause the pellets to move from inside to outside, with "inside" meaning the inner section of the screen device and "outside" meaning the outer portion of the screen device in this context. In this way, the dwell time of each and every pellet can be controllable in a simple manner according to the invention through the conveying of material along spiral paths.

The second drying zone can be arranged concentrically around the first drying zone. The first drying zone can be designed in the shape of a circle. The second drying zone can be designed in the shape of a ring. The drying zones can have an angular shape. For example, the drying zone can be rectangular.

An overflow wall can be disposed between the first drying zone and the second drying zone. The overflow wall can the process fluid from entering the second drying zone. The overflow wall can also be configured to allow the pellets to travel over the overflow wall to the second drying zone under the influence of the oscillations. In this context, the height of the overflow wall can also be used to influence the dwell time of the pellets in the first drying zone as well, wherein a higher overflow wall can prolong the dwell time and a lower overflow wall can shorten the dwell time.

In the region of the first drying zone, the drying apparatus can have at least one feed port above or to the side of (e.g. in the case of a rectangular design) the screen device. The first drying apparatus can deliver process fluid and pellets contained therein to the first drying zone. Furthermore, at least one discharge opening for discharging the pellets can be provided in the region of the second drying zone. The pellets can travel from the feed port to the discharge opening under the influence of the oscillations.

A drying fluid flow device can be provided in the region of the second drying zone such that the stream of the drying fluid, is blown, aspirated, or both about the pellets. The drying device can be a blower device. The drying fluid can be air, inert gas, or both. The inert gas can be nitrogen.

The drying fluid can be directed through the second drying zone parallel to, substantially parallel to, perpendicular to, or substantially perpendicular to the screen area. The stream of the drying fluid can be directed in the direction away from the discharge opening. The stream of the drying fluid can be in counterflow to the fundamental flow/direction of movement of the pellets, or to be in the flow direction of the flow/direction of movement of the pellets.

The drying fluid can have a temperature less than or equal to a temperature of the pellets. As such, the second drying zone can act like a cooling zone. Allowing the pellets to be cooled and dried in the second drying zone.

In one or more embodiments, the collecting and/or aspirating device for the process fluid can be provided on the other side of the screen area. For example, the collecting and/or aspirating device can be disposed underneath the screen area. The collecting and/or aspirating device can be the region of the first drying zone.

Another screen device for filtering the process fluid can be provided on the other side of the screen area. For example, the screen device can be located below the screen area. The additional screen device can be proximate to the first drying zone. The additional screen can filter any residues, fluff, dust, or the like out of the process fluid, so that the process fluid can be recycled. For example, the additional screen device can comprise only an additional screen area, wherein the screen area and the additional screen area can be set into oscillation by their own separate oscillating devices, or else by a common oscillating device. The residue filtered out of the process fluid by means of the additional screen area of the additional screen device can be discharged or drawn off or drained off through at least one or more openings.

At least one eccentric drive, at least one imbalance generator, or at least one ultrasound generator may be provided as the oscillating device for generating the oscillations. Depending on the geometry desired, it is also possible in principle to employ multiple elements of a given type. In this design, depending on the particular geometry desired, the coupling in of the oscillation may take place by means of a frame of the screen device and/or vibratory excitation of the screen area can be carried out directly, wherein the corresponding elements can be coupled directly to the screen area in the latter case.

An additional drying apparatus can be provided in such a way that a multistage drying apparatus is created for the pellets. The additional drying apparatus can follow the screen device. The additional apparatus can be a centrifugal drying device, a fluidized bed drying device, or combinations thereof. An additional preliminary dewatering, for example by means of a centrifugal drying device, can also be provided.

The screen area can have a flat design. The screen area can be designed to be continuous. The drying apparatus can be employed as an apparatus for the drying of micropellets, which can have a diameter of less than 0.8 mm, for example.

FIG. 1 schematically shows a pelletizing unit using a drying apparatus 100. The material to be pelletized can be fed from a hopper 12 to an extruder 13 where, in an underwater pelletizing process (UWG), it is pelletized into pellets 16 in a process fluid 17. The process fluid 17 with the pellets 16 contained therein is then delivered to the drying apparatus 100 with a screen device 1. The screen area of the screen device 1 with screen openings is set into oscillation such that the pellets 16 move relative to the screen openings, wherein the process fluid 17 drains off through the screen openings, is returned to an equalizing tank 14, and delivered back to the extruder 13 by means of an appropriate circulating device 15, for example a pump. As appropriate, further drying apparatuses in addition to the screen device 1 may also be provided, as shown in FIG. 1. For example, a fluidized bed drying device 10 and/or a centrifugal drying device 9. These may be used for further drying of the pellets 16. The process fluid 17 from these additional drying devices 9 and 10 is likewise returned to the equalizing tank 14, as shown in FIG. 1. The pellets 16 that are extracted can be delivered to equipment for subsequent processing (not shown).

Figure 2:
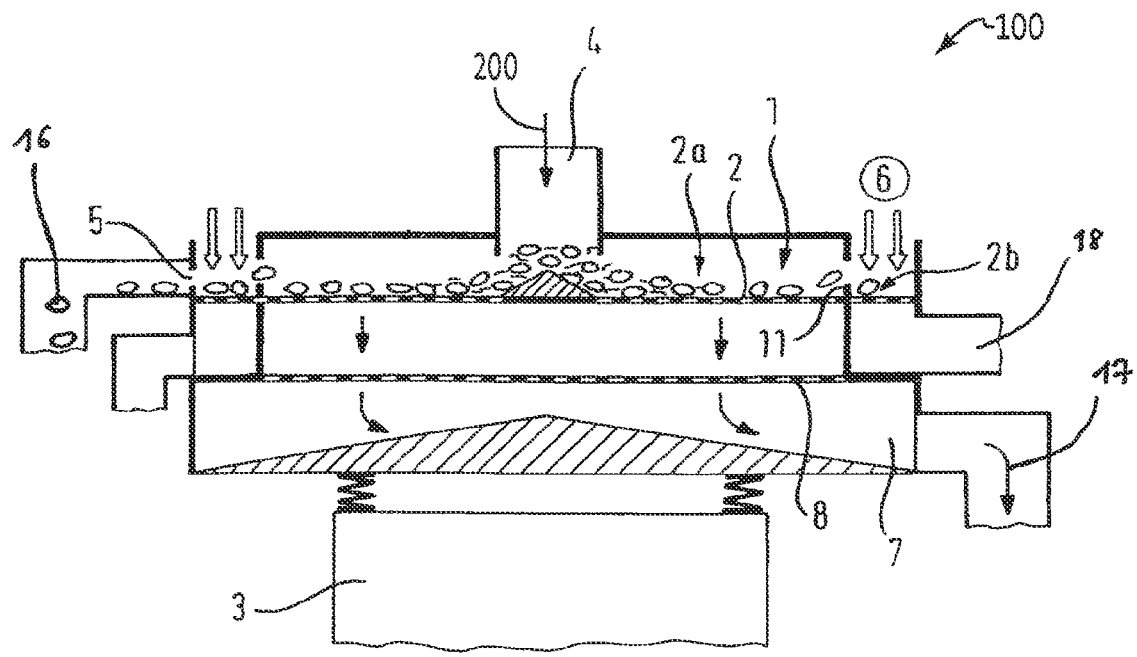
FIG. 2 depicts a drying apparatus according to one or more embodiments.

FIG. 2 schematically shows a sectional view of the drying apparatus 100 for drying pellets from the process fluid according to one or more embodiments of the invention.

The drying apparatus 100 can have at least one screen device 1 with a continuous screen area 2 with screen openings (white areas of the screen area 2 in FIG. 2). These screen openings can have cross-sectional areas that are smaller in area than the cross-sectional areas of the smallest pellets 16 to be dried. The drying apparatus 100, screen device 1, or both can be rotationally symmetric. The screen area 2 of the screen device 1 can have a first drying zone 2a, to which the pellets 16 in the process fluid 17 are delivered (in accordance with the arrow in FIG. 2). The process fluid 17 can drain off through the screen openings in the first drying zone 2a. A second drying zone 2b can receive still damp pellets 16. The still damp pellets 16 can be subjected to a stream of a drying fluid (indicated by the corresponding arrows in FIG. 2). Air or an inert gas, such as nitrogen for example, can be employed as the drying fluid. The stream of the drying fluid comes from a drying fluid flow device 6. The drying fluid flow device 6 can be configured to move the stream of drying fluid about the pellets 16. The drying fluid can be discharged from the second drying zone 2b through one or more outlets 18.

An oscillating device 3 can be configured to deliver a stream 200, which includes the pellets 16 and the process fluid 17, through a feed port 4 to the first drying zone 2a above the screen device 1. The oscillating device 3 can move from the first drying zone 2a to the second drying zone 2b under the influence of the oscillations. In this process, the pellets 16 can follow spiral paths.

As is evident from FIG. 2, the second drying zone 2b can be arranged concentrically around the first drying zone 2a. The first drying zone 2a can be designed in the shape of a circle and the second drying zone 2b can be designed in the shape of a ring.

The process fluid 17 drains downward through the screen openings in the first drying zone 2a, as is indicated in FIG. 2 by the corresponding arrows. Relative to the screen openings, the pellets 16 move outward over the screen openings from the central region of the feed port 4. An overflow wall 11 can separate the first drying zone 2a from the second drying zone 2b. The overflow wall 11 can prevent the entry of process fluid 17 into the second drying zone 2b from the first drying zone 2a. The pellets 16 reach the second drying zone 2b over the overflow wall 11 under the influence of the oscillations. At least one discharge opening 5 for discharging the pellets 16 is provided in the region of the second drying zone 2b. The pellets 16 can travel from the feed port 4 to the discharge opening 5 under the influence of the oscillations.

A collecting and/or aspirating device 7 can be used to collect the process fluid 17. The collecting and/or aspirating device 7 can be underneath the screen area 2. Another screen device 8 can be for filtering the process fluid 17. In accordance with the embodiment shown in FIG. 2, the additional screen device 8 comprises (only) an additional screen area without its own oscillating device as oscillating drive, with the actual screen area 2 and the additional screen area of the additional screen device 8 being set into oscillation together by the oscillating device 3. However, the additional screen device 8 can also have its own separate oscillating device (not shown here) in addition to the oscillating device 3. The residue filtered out of the process fluid 17 by means of the additional screen area of the additional screen device 8 can be discharged or drawn off or drained off through at least one or more openings (not shown in FIG. 2).

The temperature of the drying fluid can be less than or equal to the temperature of the pellets, so that the second drying zone 2b is at the same time a cooling zone in which a cooling of the pellets 16 can take place.

While these embodiments have been described with emphasis on the embodiments, it should be understood that within the scope of the appended claims, the embodiments might be practiced other than as specifically described herein.

What is claimed is:
1. A drying apparatus for drying pellets from a process fluid, wherein the drying apparatus comprises:

a. a screen device that has a screen area, wherein the screen area has screen openings; wherein the screen area comprises:
  (i) cross-sectional areas that are smaller in area than the cross-sectional areas of the smallest pellets;
  (ii) a first drying zone to which the pellets in the process fluid are delivered and in which the process fluid drains off through the screen openings;
  (iii) a second drying zone in which the still damp pellets are subjected to a stream of drying fluid;
b. an oscillating device configured to oscillate the screen device such that the pellets move from the first drying zone to the second drying zone under the influence of the oscillations; and
c. an overflow wall separating the first drying area from the second drying area, wherein the overflow wall prevents the process fluid in the first drying zone from entering the second drying zone and allows the pellets to travel to the second drying zone under the influence of oscillations.

2. The drying apparatus of claim 1, wherein the oscillating device is arranged and operated such that the pellets move from the first drying zone to the second drying zone along spiral paths under the influence of the oscillations, preferably alone spiral paths from the inside to the outside.

3. The drying apparatus of claim 2, wherein the second drying zone is arranged concentrically around the first drying zone, wherein the first drying zone preferably is designed in the shape of a circle and the second drying zone is designed in the shape of a ring.

4. The drying apparatus of claim 3, wherein at least one feed port for delivering process fluid and pellets is located proximate or in the first drying zone, and wherein the at least one fee port is above or to the side of the screen device, and wherein a discharge opening is configured to receive pellets from the feed port and to discharge the pellets, and wherein the travel from the feed port to the discharge port under the influence of oscillation.

5. The drying apparatus of claim 1, wherein the second drying zone is arranged concentrically around the first drying zone, wherein the first drying zone preferably is designed in the shape of a circle and the second drying zone is designed in the shape of a ring.

6. The drying apparatus of claim 1, wherein a drying fluid flow device is provided in the region of the second drying zone, so that the stream of the drying fluid is blown, aspirated, or both about the pellets.

7. The drying apparatus of claim 6, wherein the drying fluid is air, an inert gas, or combinations thereof.

8. The drying apparatus of claim 1, wherein the drying fluid is air, an inert gas, or combinations thereof.

9. The drying apparatus of claim 1, wherein a drying fluid flow device is provided in the region of the second drying zone, so that the stream of the drying fluid is blown, aspirated, or both about the pellets.

10. The drying apparatus of claim 6, wherein the stream of the drying fluid is directed through the second drying zone parallel to, substantially parallel to, perpendicular to, substantially perpendicular to, the screen area, and wherein the stream of drying fluid is directed in the direction away from the discharge opening.

11. The drying apparatus of claim 6, wherein the drying fluid is air, an inert gas, or combinations thereof.

12. The drying apparatus of claim 6, wherein the drying fluid has a temperature less than or equal to a temperature of the pellets, so that the second drying zone is also a cooling zone in which a cooling of the pellets takes place.

13. The drying apparatus of claim 1, wherein the drying fluid is air, an inert gas, or combinations thereof.

14. The drying apparatus of claim 1, further comprising a collecting device, a aspirating device, or combinations thereof located in the screen area, wherein the collecting device, the aspirating device, or combinations is configured to collect the process fluid.

15. The drying apparatus of claim 1, further comprising an additional screen device configured to filter the process fluid.

16. The drying apparatus of claim 1, further comprising an additional drying apparatus, and wherein the screen device is configured to provide multistage drying of the pellets, and wherein the wherein the drying apparatus are a fluidized bed drying device, a centrifugal drying device, or combinations thereof.

17. The drying apparatus of claim 1, wherein the oscillating device is an eccentric drive, a imbalance generator, an ultrasound generator or combinations thereof.

18. The drying apparatus of claim 1, wherein the screen area is flat.

19. The drying apparatus of claim 1, wherein the pellets micropellets.

* * * * *